United States Patent [19]

Linke et al.

[11] Patent Number: 4,942,795
[45] Date of Patent: Jul. 24, 1990

[54] PRECISION CUTTER WITH AUTOMATED PRESSURE CONTROL

[75] Inventors: Thomas A. Linke, Wadsworth, Ill.; Alan W. Wilkerson, Cedarburg, Wis.; Ashok K. Parida, Frankfort, Ill.

[73] Assignee: Buehler Ltd., Lake Bluff, Ill.

[21] Appl. No.: 201,531

[22] Filed: Jun. 2, 1988

[51] Int. Cl.⁵ .................................. B23Q 15/013
[52] U.S. Cl. ............................ 83/72; 83/403.1; 83/411.3; 83/412; 83/733
[58] Field of Search .............. 51/165 R, 165, 76; 83/62, 62.1, 72, 74, 76, 397, 478, 410, 411, 522, 439, 491, 504, 412, 429, 403.1, 733, 734, 410.7, 410.8, 411.3, 522.14; 73/104, 862.06; 250/231 SE

[56] References Cited

U.S. PATENT DOCUMENTS

| 2,649,646 | 8/1953 | Remmen ................................ 83/72 |
| 3,056,239 | 10/1962 | Seidel et al. ..................... 51/165 R |
| 3,724,138 | 4/1973 | Ishikawa ............................ 51/165 R |
| 3,744,361 | 7/1973 | Van Doorn et al. ................. 83/37 |
| 4,033,218 | 7/1977 | Donatelle .......................... 83/478 |
| 4,082,025 | 4/1978 | Reinbacher ...................... 83/411 R |
| 4,091,698 | 5/1978 | Obear et al. ..................... 83/34 |
| 4,162,643 | 7/1979 | Coburn ............................. 83/499 |
| 4,422,026 | 12/1983 | Starai ....................... 250/231 SE X |
| 4,543,867 | 10/1985 | Ichikawa .......................... 83/502 |
| 4,554,450 | 11/1985 | Goepel ......................... 250/231 SE |
| 4,625,608 | 12/1986 | Behme et al. ................. 83/412 X |

Primary Examiner—Frank T. Yost
Assistant Examiner—Eugenia A. Jones
Attorney, Agent, or Firm—Allegretti & Witcoff, Ltd.

[57] ABSTRACT

A saw apparatus comprises an operatable saw blade and a holding arm for gripping an object to be sawed, plus means for moving the saw blade and holding arm together to cause the saw blade to engage the object for sawing under controlled-pressure conditions. The saw blade is carried by strain gauge means, the strain gauge means being part of electronic means for sensing the load of the operatable saw blade on the strain gauge means. Thus, pressure of the object for sawing against the top of the saw blade causes an increase in the load sensed by the strain gauge. The electronic signal generated thereby may be used in a feedback system to control the pressure of the workpiece against the saw blade.

15 Claims, 4 Drawing Sheets

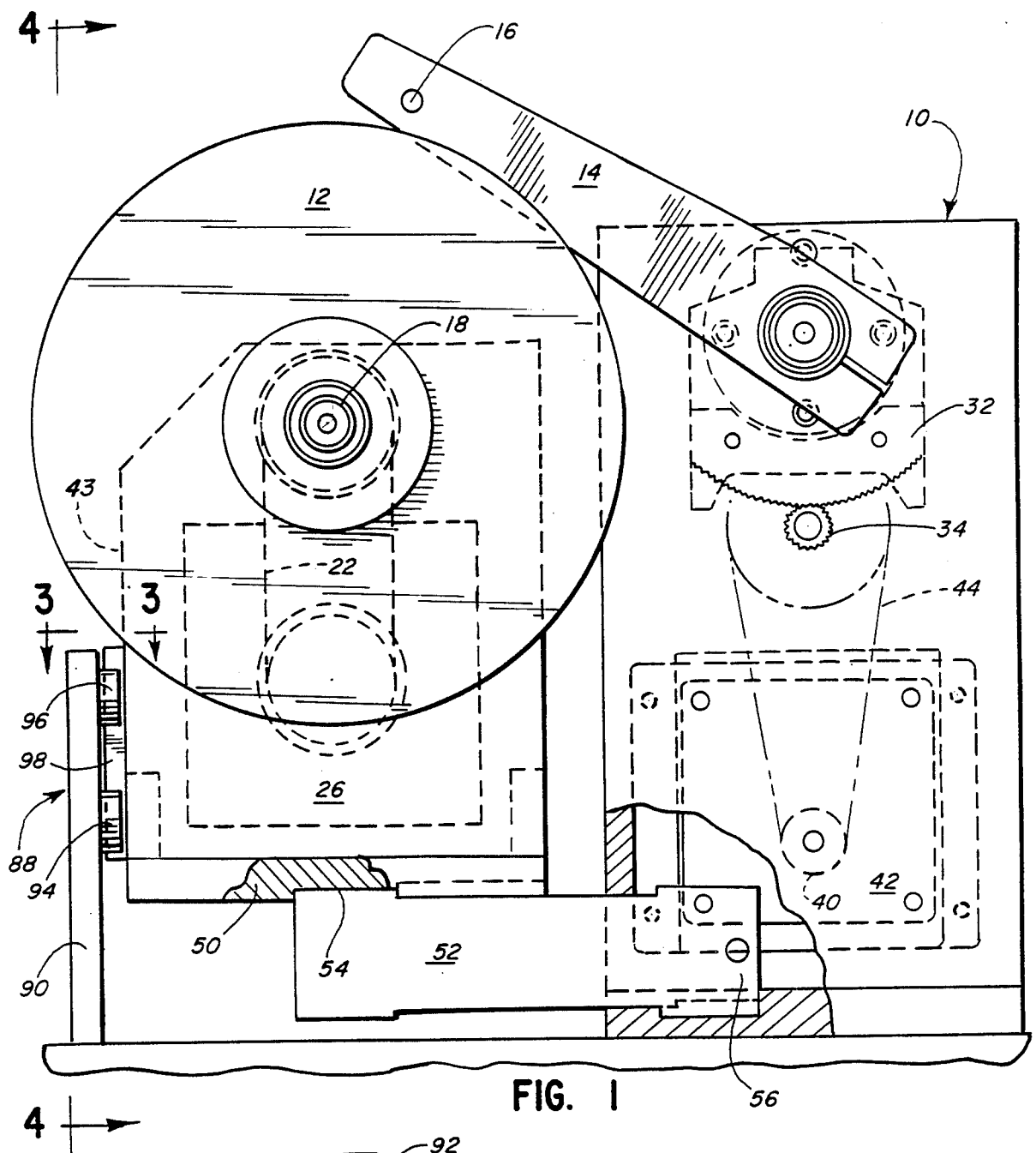
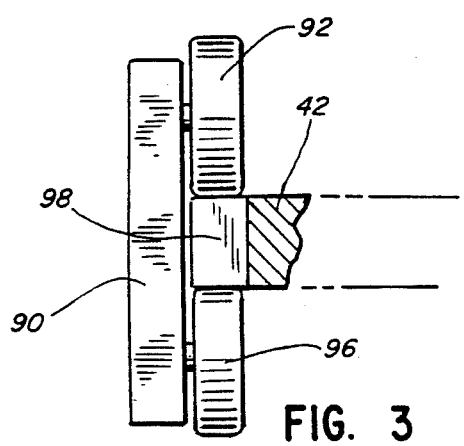
FIG. 1
FIG. 3

PRECISION CUTTER WITH AUTOMATED PRESSURE CONTROL

BACKGROUND OF THE INVENTION

In Vincent, et al U.S. Pat. No. 4,424,649, an abrasive cutter for cutting metallurgical samples and the like includes a motor-driven, rotatable abrasive cutter wheel, a vise assembly for holding the workpiece to be cut, and a manually operable workpiece advance lever which is actuated by the operator to move the vice assembly along the path toward the cutter to bring the workpiece into engagement with the cutter wheel. Devices of this type are commercially available. For example, Buehler Ltd. of Lake Bluff, Illinois sells the Isomet Low Speed Saw, which is for the precision, low deformation cutting of metal, ceramic, and geological specimens, typically for microscopic analysis of the specimen surface. The Isomet Low Speed Saw utilizes a weight system to place a constant pressure between the saw and the sample to be cut. Such a weight system requires a manual application of weights to a spindle to achieve the desired pressure of the saw against the workpiece.

To protect the quality and integrity of the workpiece surface, and also to protect the saw blade, it is important to assure that excess torque is not applied to the saw during the cutting process. Particularly at higher rotation speeds and at higher pressures, the heat generated by the sawing process can damage either the sample, the saw blade, or both. In a gravity-type system where the pressure of the saw blade against the workpiece is governed by the number of weights applied to the system, an operator's miscalculation may cause excessive weight to be added to the system at the particular torque being applied. Also in such cutting processes, it would be desirable to operate with a predetermined saw blade rotation, but if the saw is set to operate at desired rate of rotation, that makes the possibility of overheating even more likely in the event excess weight has been accidentally used, because the overall energy placed in the system will rise as the motor forces the saw blade to cut at that set rotation rate under high friction, high torque circumstances.

In accordance with invention, apparatus is provided for processing the workpiece, for example a saw apparatus, in which the pressure between the saw and the workpiece can be automatically maintained by electronic means. This of course provides a significant advantage in ease of operation, and permits changing of the pressure between the saw blade and the workpiece as desired during the operation. Additionally, the invention permits an override system to reduce the pressure between the saw blade and workpiece when the torque approaches a preset maximum at which damage to the workpiece, the saw blade, or the saw motor might occur due to excessive torque or temperature of operation.

DESCRIPTION OF THE INVENTION

The invention of this application relates to apparatus for processing a workpiece including an operable processing member such as precision saw, or a polishing unit, for example. Means are provided for gripping the workpiece, as well as means for moving the processing member and the workpiece together to process the workpiece under controlled-pressure conditions.

In accordance with this invention, one of the workpiece and the processing member are carried by strain gauge means. The strain gauge means is part of electronic means for sensing load imposed on the strain gauge means, with the result that a load differential, caused by the pressure imposed between the processing member and workpiece during the processing of the workpiece, may be sensed.

Control means are also provided for controlling the means for moving the processing member and the workpiece together, to keep the pressure between the processing member and workpiece at a predetermined value by means of monitoring of the load differential. This differential is the difference in load sensed by the strain gauge while the processing member is operating from the normal, unmodified load of the processing member per se.

Specifically, the apparatus shown comprises an operatable saw blade, a holding arm for gripping an object to be sawed, and means for moving the saw blade and holding arm together to cause the saw blade to engage the object for sawing under controlled-pressure conditions.

By this invention, the operable saw blade may be carried by the strain gauge means, the strain gauge means being part of electronic means for sensing the load of the operable saw blade on the strain gauge means.

The holding arm is positioned to bring the object into contact with an upper portion of the saw blade by action of the moving means. As the result of this, an increase is caused in the load sensed by the electronic means through the strain gauge means when the saw blade is engaging and cutting the object to be sawed. This load increase corresponds to the pressure exerted between the object and saw blade. Control means are also provided for controlling the moving means to keep the pressure between the saw blade and object to be sawed at a predetermined value by monitoring of the sensed increase in the load.

The saw blade may be a circular saw rotated by an electric motor. Means are provide for controlling the rotation of the saw blade at a predetermined, substantially constant rate. Means are also provided for sensing the power drawn by the electric motor, and means are provided for causing the moving means to reduce the exerted pressure below the predetermined value when that is necessary to keep power drawn below a predetermined upper limit. As stated above, this predetermined upper limit may be set to protect both the quality of the cut workpiece, the saw itself, and the electric motor.

The saw blade is typically carried on a shaft, the shaft carrying a peripherally perforated disk. Sensor means are provided for measuring the rotation of the disk by sensing of the moving of peripheral perforations. By this means, the rotation control means mentioned above is capable of controlling the rate of saw blade rotation responsive to signals from the sensor means. It is also desirable for the moving means to cause the saw blade and arm to spontaneously move away from each other when a sudden increase in the rate of approach to each other is sensed, indicating breakthrough of the workpiece and completion of the sawing process. Typically, the moving means moves the arm toward and away from the saw blade, with the saw blade remaining stationary except for the sawing motion of the saw blade.

The holding arm may be carried on a shaft, with the shaft being longitudinally expansible and contractable to permit lateral motion of the arm relative to the saw blade. This permits adjustment of the sawing position between the saw and the workpiece (object for sawing). Optical means may be provided for determining the rotational position of the arm so that the position may be read out electronically for precise setting of cutting thicknesses in the workpiece and the like.

The means for moving the saw blade and holding arm together and apart may preferably comprise a four-quadrant direct current static drive electric motor of less than one horsepower. Such an electric motor may operate with extreme accuracy, for precise control of the position of the arm relative to the saw blade, and the pressure exerted against the workpiece by the saw blade.

As an added preferred feature, the saw blade and holding arm may be enclosed in an openable hood. Switch means may be provided whereby opening of the hood for access causes the pressure exerted between the saw blade and an object to be reduced to a kirf load. The term "kirf load" implies a low load sufficient primarily to permit the saw to cut a small groove into the workpiece prior to increasing the load to desired operating range. A kirf load is typically 30-50 grams.

Timer means may also be provided whereby, at the start of the sawing operation, the moving means applies a low pressure kirf load between the saw blade and object for sawing by a predetermined time prior to increasing the pressure to the predetermined value. For example, a 7-second predetermined time may be used.

Means as specifically disclosed may be provided to prevent twisting of the saw blade, and the frame that carries it, as pressure is applied between the saw blade and the object. This is particularly desirable in the device of this invention since the saw blade is mounted on a strain gauge, which is typically a fairly narrow bar. By the particular anti-twisting system used herein, accurate loads of the saw blade and load on the workpiece may be measured despite the presence of significant twisting forces during operation.

DESCRIPTION OF DRAWINGS

In the drawings,

FIG. 1 is an elevational view of the apparatus of this invention, with parts broken away.

FIG. 3 is a sectional view taken along line 3—3 of FIG. 1.

DESCRIPTION OF SPECIFIC EMBODIMENT

Figure 2:
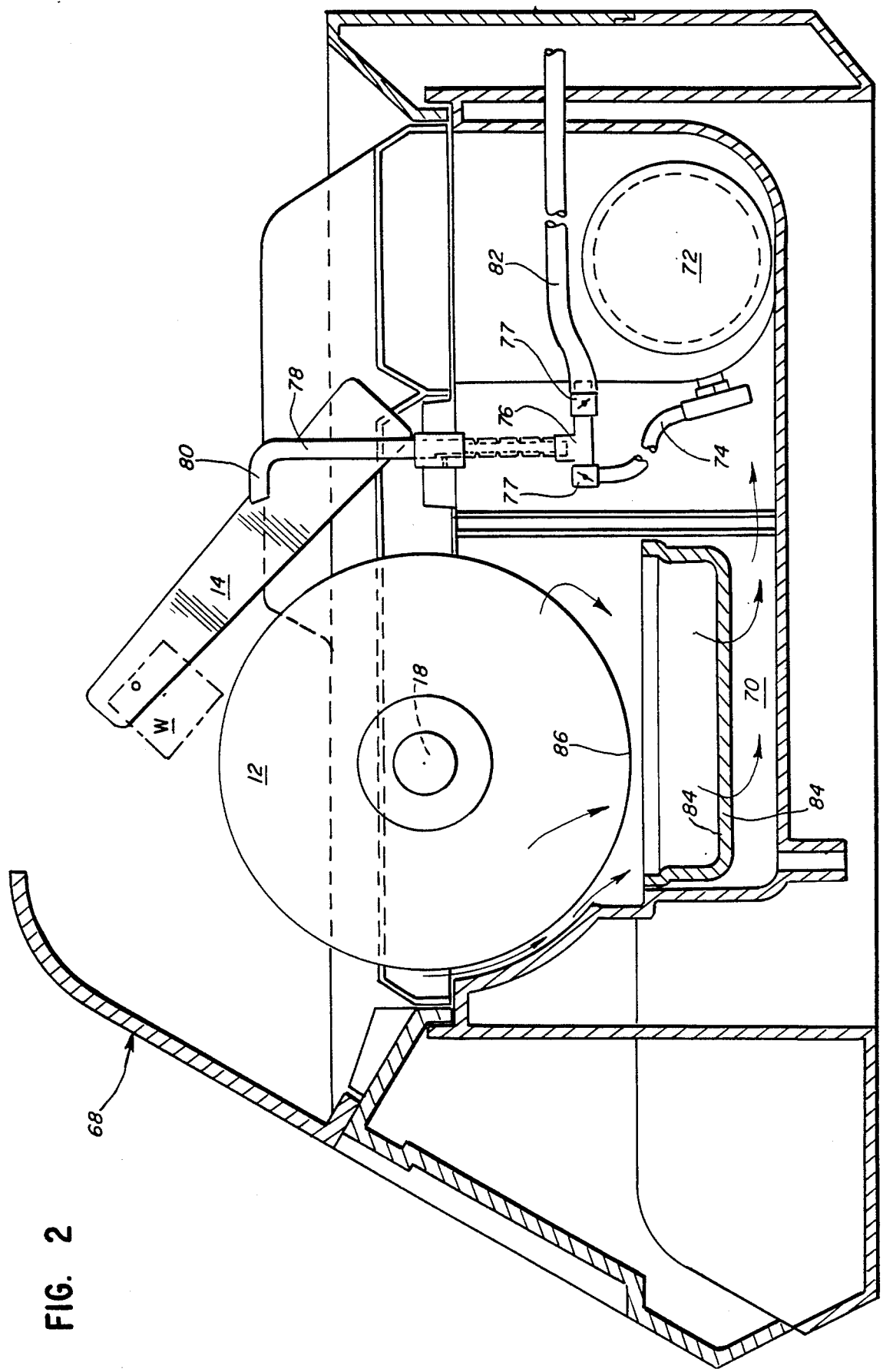
FIG. 2 is a transverse sectional view of the same apparatus, taken from the perspective of FIG. 1.

Referring to the drawings, FIG. 1 discloses a saw apparatus 10 which comprises an operatable saw blade 12, typically a disc-type diamond saw blade or the like for fine cutting of surfaces of analysis. Generally, the saw apparatus of this invention is similar in structure and function to the Isomet brand low speed saw which is currently available from Buehler Ltd., with the structural distinctions and advantages of this invention being as described herein.

A pivotable holding arm 14 is provided having a conventional attachment 16 for holding a chuck of any desired design for gripping the object to be sawed.

Figure 4:
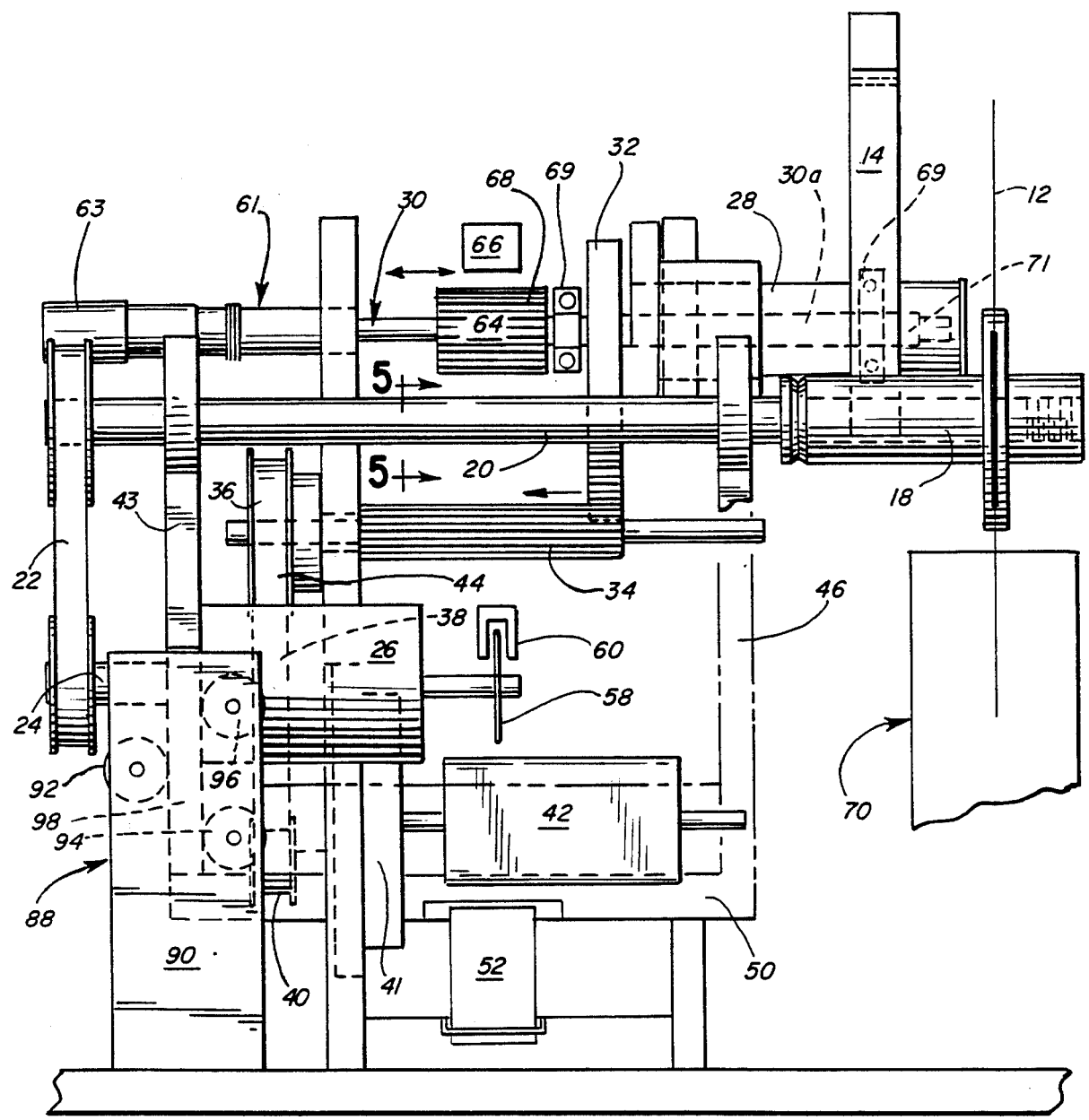
FIG. 4 is a view taken along line 4—4 of FIG. 1.

Referring particularly to FIG. 4, saw blade 12 is shown to be carried on a holder 18 which, in turn, is carried on a shaft 20, connected by belt drive 22 to an operating shaft 24 of a ¼ hp. direct current blade drive motor 26. Pivotable holding arm 14 is carried on holder member 28, which, in turn, is carried on shaft 30. Gear segment 32 is connected to holder member 28 (a gear segment only being needed because arm 14 does not rotate a full 360 degrees). The teeth of gear segment 32 engage with the elongated teeth of drive pinion 34. Drive pinion 34, in turn, carries timing pulley 36, which is connected by belt 38 to pulley 40, which is controlled through gearbox 41 by D.C. drive motor 42. Drive motor 42 may be a fractional horse power direct current gear motor 42, which thus may be operated to control the rotational position of arm 14, and the pressure that it exerts on a workpiece against saw blade 12. It can be seen that belt 38 and pulleys 36, 40 are positioned behind motor 26 from the viewpoint of FIG. 4.

Various support members 43, 44, 46 may be provided for holding of the respective parts of the apparatus.

In accordance with this invention, saw blade 12, motor 26, and the connecting parts are carried on a platform 50. Platform 50, in turn, is carried on a strain gauge 52, of conventional design, which is capable of providing varying electrical resistivity dependent upon the load placed on free end 54 of the strain gauge, to provide an accurate electronic readout of the load sensed by strain gauge 52. Strain gauge 52 is attached at its other end 56 to the frame of the apparatus, and conveniently to motor 42, although the mode and location of attachment of end 56 of strain gauge 52 is not critical.

The term "strain gauge" has been used herein to describe the member shown at 52 in FIG. 1 which is mounted with its right hand end fixed so that its left hand end will support in cantilever fashion the saw blade 12, the saw blade motor 26 and related drive components and the framework on which the foregoing are mounted. As described herein, the member 52 is an elongated beam-like member which supports the foregoing components in cantilever fashion and produces a voltage which is proportional to the load supported thereon. It should be understood that the term "load cell" may be more appropriate to decribe the member 52 since the term "strain gauge" is often used for small individual wire elements and the member 52 may include a plurality of such individual wire elements. Thus, for purposes of this application, the term "strain gauge" should be considered the equivalent of a "load cell" since the member 52 is obviously a beam-like member as compared to a small, individual wire element.

It can be seen from FIG. 2 in particular that holding arm 14 is positioned to bring the object for sawing (workpiece W) into contact with an upper portion of saw blade 12. Thus, as arm 14 drives workpiece W into blande 12, an increase in the load of the saw blade and related parts is sensed by electronic means including strain gauge 52. This load increase corresponds to the force or pressure exerted between workpiece W and saw blade 12. Circuitry is also provide to keep such pressure exerted between the workpiece and saw blade at a predetermined value by monitoring of the sensed increase in the load, as further discussed with respect to FIG. 6.

Figure 5:
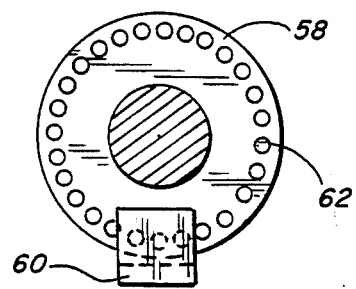
FIG. 5 is a sectional view taken along line 5—5 of FIG. 4.

As shown in FIG. 4, shaft 20, which carries saw blade 12, also carries a peripherally perforated disk 58. A conventional optical sensor 60 is provided as shown in FIGS. 4 and 5 to pass a beam of light across the perforated disk 58. Thus, as shaft 20 rotates, the beam of light of optic sensor 60 will flicker in an intermittent manner in the sensor 60, depending upon the number of holes 62 that pass through the beam of light. Thus, conventional electronic means can be used to translate the number of pulses of light sensed into a velocity of rotation of shaft 20, to provide an electronic indication of the rotational velocity of saw.blade 12. Disk 58 may also be carried on the output of motor 26.

Arm 14 is carried on shaft 30 as stated before. Outer holder 28 for arm 14 is carried on shaft 30, by two ball bearings 69, along with arm 14 and gear segment 32, holder 28 being connected to shaft 30 by lock nut 71 so that shaft extension 30a is rotatable on the other race of bearings 69. Shaft 30 carries, at its other end, micrometer means 61 which may be manually rotated ay handle 63, so that as handle 63 is rotated, shaft 30 also rotates. With such rotation, member 28, arm 14, and gear segment 32 may be longitudinally moved back and forth to provide a transverse adjustment to the relationship between arm 14 and saw blade 12, because of their screw-threaded relationship with shaft 30. Thus, variable thicknesses of workpiece may be cut by saw blade 12. It can be seen that the threads of drive pinion 34 are elongated for the purpose of permitting gear segment 32 to slide (to the left) along drive pinion 34 as handle 63 is rotated, to permit transverse adjustment of arm 14 and saw blade 12.

Additionally, as an added part of micrometer means 61, shaft 30 carries a stripper cylindrical member 64 which rotates with shaft 30. Optical sensor 66, making use for example of bar code reading technology, can count the rotating bars 68 on member 64 as it rotates. Thus, as handle 63 of micrometer adjustment member 61 is turned, shaft 30 and member 64 also turn, as shaft 30 and holder 28 together elongate of reduce in length due to the turning action. Since the amount of elongation and the corresponding rightward or leftward movement of arm 14 correlates with the amount of rotation of shaft 30 and member 64, bar code reader 66 can provide an electronic indication of the transverse position of arm 14, so that the cutting width of saw 12 against workpiece W can be precisely set from an electronic control panel.

The apparatus may be covered by an openable hood, a fragment of which is shown at reference numeral 68 of FIG. 2. As shown below, opening of the hood for access to the saw blade causes the system to cease operation and arm 14 to rise to its "full up" position.

As shown in FIG. 2, the apparatus of this invention exhibits the capability to provide lubricant onto the saw blade for the cutting operation. Tank 70 is provided below saw blade 12 for containing lubricating water or oil. Pump 72 is positioned within the tank 70, with the pump outlet communicating with conduit 74, which, in turn, communicates with a T-connector 76, having one-way valves 77. One branch of the T-connector 76 constitutes another conduit 78 with an angled end 80 for directing lubricating fluid horizontally against the edge of saw blade 12. Conduit 82 is provide to communicate with an external source of lubricant fluid when that is desired.

When saw blade 12 is rotating relatively slowly, the lower edge 86 of saw blade 12 dips into the fluid for lubrication. When saw blade 12 is rotating at a faster rate, fluid from the main reservoir 70 passes through pump 72 and through conduit 78 to the edge of blade 12, since at high rotation lubricant fluid picked up at point 86 on the saw blade may be thrown off before it reaches the area of engagement with workpiece W. Filter 84 is provided.

It can be seen particularly from FIGS. 1 and 4 that the apparatus which is carried on platform 50 may be in relatively unbalanced relation with respect to the strain gauge 52. Even if the strain gauge is balanced, an unbalanced condition may then be created if substantial pressure is provided by arm 14 against saw blade 12 through the workpiece or object for sawing. This unbalanced condition could cause undesirable tilting of the system, but for means 88 for preventing such twisting as shown in FIGS. 1 and 4.

Means 88 includes a stationary pedestal 90, which carries, in this specific embodiment, three eccentric roller bearings 92, 94, 96. Roller bearings 94, 96 are spaced by a vertical channel from roller bearing 92, which channel is occupied by a rib portion 98 of frame member 43, frame member 43 being part of the structure which rests on strain gauge 52. Thus, while it is possible for the structure resting on strain gauge 52 to move small distances up and down in a manner dependent upon the load of the device and varying loads against blade 12, twisting in the direction encompassed by the plane occupied by roller bearings 92, 94, 96 is minimized. This significantly increases the parallelism of the sample cut by avoiding twisting.

Figure 6:
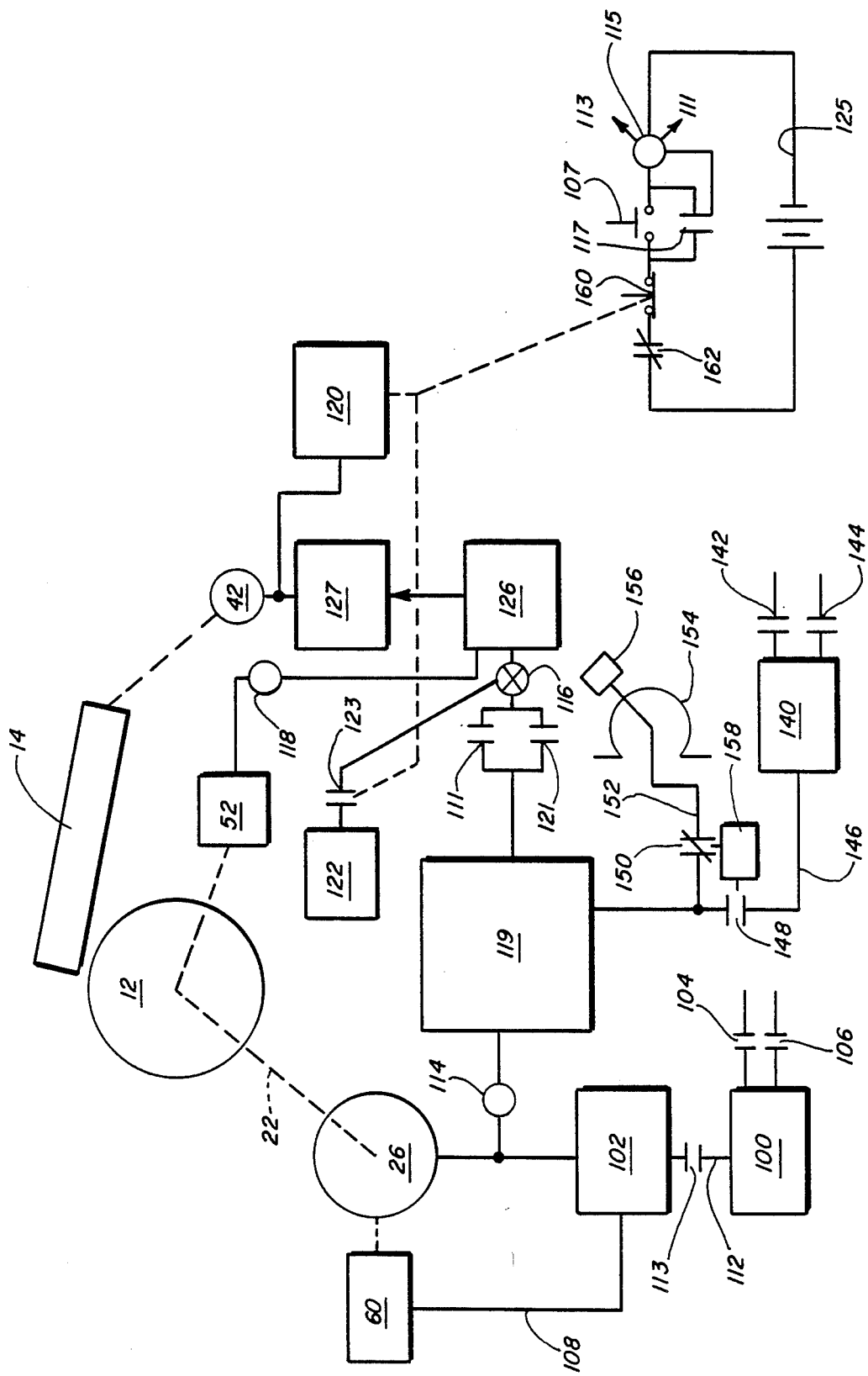
FIG. 6 is a functional block diagram of the apparatus of the previous drawings.

Turning now to FIG. 6, the functional block diagram shown therein is to basically illustrate the functioning of the device of this invention, and not primarily the specific electronic circuitry or structure involved. Those who are skilled in electronics will find no difficulty in designing electronic systems to accomplish these specific functions of the device as described herein.

Saw blade 12 is connected to ¼ hp. DC motor 26 by belt 22. A reference voltage supply 100 communicates with a comparator system 102 for regulation of the speed of the saw blade operation. To increase the speed, one reference voltage at 104 is provided, while to decrease the speed another reference voltage 106 is provided to speed regulator 102. This is compared with a feedback signal 108 from pulse pickup 60 that monitors the rotation of shaft 20 and saw blade 12. Feedback signal 108 is compared with reference signal 112 to keep the saw blade rotation rate constant, signalling motor 26 to supply the necessary amount of torque to accomplish this. Contact 113 is closed by pressing the "run" button of the apparatus to actuate motor 26. The details of the "run" button function are that when manual run button 107 is pressed, button relay 115 is actuated to also close contacts 111, 113, and 117. Circuit 125 operates to keep contacts 111, 113, and 117 closed without continued manual pressing of run buttom 117.

The torque of motor 26 may be also sensed through sensor 114. If the output of motor 26 reaches a predetemined amount as indicated by sensor 114, a signal is sent by limiter circuit 119 to cause arm 14 to reduce pressure of the workpiece against saw blade 12, to cause the torque output of motor 26 to reduce to the desired maximum level, as described below. This signal will pass from circuit 119 to summing junction 116 through contact 111, which is turned by actuating run button 107. Alternatively, before the apparatus is actuated by depressing run buttom 107, arm 14 may be lowered by actuating a switch that closes contact 121 to permit a signal to pass through limiter circuit 119 through summing junction 116 to comparator 126 for that purpose.

Arm 14 is connected to the DC motor 42 through a gear box 41 as shown in FIG. 4 (having a gear ratio of 358:1 in this specific embodiment). The voltage of the same motor 42 may be monitored by sensor 120, to sense for an abrupt voltage rise indicative of a sudden collapse of resistance between the sample and the saw blade, indicating breakthrough. At this point, a signal may be sent from sensor 120 to close contact 123 to permit a signal from reference voltage source 122 to pass to summing junction 116 to cause motor 42 to retract arm 14. Thus, a resultant signal from summing junction 116 may serve as the feedback signal in comparator 126 for arm motor 42. Strain gauge 52 continuously records the system load through conventional electronic system 118, to send an appropriate signal to comparator 126 as a reference signal. A resultant control signal is then sent from comparator 126 to speed regulator 127, to control motor 42.

The set load reference potential 140 may be increased or decreased by manually operated contacts 142 or 144. The signal from load reference 140 passes through circuit 146 to a contact 148 which is set to be open when contact 150 of circuit 152 is closed and vice versa. Contact 150 is initially closed, and potentiometer 154 provides a predetermined fractional potential from reference potential 156. Timer 158 is provided to keep contact 150 closed and contact 148 open for a predetermined time following the initiation of run by run button 107, for example seven seconds. Thus, the signal from circuit 152 predominates to serve as the reference potential into comparator and limiter circuit 119, the feedback signal being provided through sensor 114. In this condition, a signal will be sent from circuit 119 to comparator 126 to cause motor 42 to place only a kirf load on the workpiece carried against saw blade 12.

At the end of the desired time, timer 158 opens contact 150 and closes contact 148, so that the set load reference potential 140 becomes the reference in circuit 119. Thus, comparator 126 causes gear motor 42 to activate arm 14 up to the set load.

Accordingly, the speed of rotation of shaft 20 and saw blade 12 is monitored by pulse pick up 60 to provide a feedback to speed regulator 102 for the saw blade motor. The desired velocity or reference signal is provided by circuit 112 for comparison with feedback 108 in speed regulator 102. The power drawn by motor 26 will be monitored by circuit 119 as a feedback, while the desired load that gear motor 42 places upon arm 14 may be set by load reference 140 through circuit 146, subject to the initial minimum force or kirf load circuit 152. These two signals will be compared in circuit 119, and in the event that the set load 140 and the desired saw blade speed causes the power drawn by motor 26 to reach a certain upper limit, circuit 119 will send a signal to comparator 126 to reduce to pressure of arm 14 until the set power drawn by motor 26 is reduced to the maximum permited level.

In comparator 126, the load detected by strain gauge 52 serves as a feedback against the signal from summing junction 116 for desired control of the pressure of the workpiece against the saw blade, as governed by motor 42 under the control of speed regulator 127. Upon a sudden surge in voltage in motor 42, indicative of the saw blade breaking through the workpiece, stop button 160 is opened to terminate operation of the apparatus, and arm raising contact 123 is closed so that the reference voltage 122 is added in summing junction 116 to cause comparator 126 to induce motor 42 to raise arm 14.

Contact 162 is connected to the openable and closable hood 68, and is open when hood 68 is open so that the apparatus is disabled from running.

Thus, a substantially automated system for precision sawing is provided in which saw blade velocities and load of the saw blade against the sample can be preset into the system, and the system will spontaneously comply with the desired, set-in parameters. At the same time, an overriding limit of torque on motor 26 may be provided to prevent damage to the sample or the saw blade. The system provides very accurate measurements due to the use of the strain gauge and other structural features described and claimed herein, for greatly facilitated preparation of sawed samples for microstructural analysis.

The above has been offered for illustrative purposes only, and is not intended to limit the scope of the invention of this application, which is as defined in the claims below.

That which is claimed is:

1. In an automatic saw of the type having a rotatable saw blade for cutting through a workpiece which is carried on a movable arm which permits the workpiece to be moved into engagement with the saw blade for cutting through the workpiece, the improvement comprising, in combination, a rotatable saw blade mounted on a first shaft, a saw blade drive motor for rotating said first shaft, first frame means supporting said saw blade motor and said first shaft and said saw blade, load cell means providing an electical output signal corresponding to a load supported thereon, said first frame means being mounted on said load cell means to measure the force exerted against said saw blade by said workpiece, arm means for carrying said workpiece, and arm drive means for moving said arm means toward said saw blade, said arm drive means being controlled in response to said electrical output signal.

2. In an automatic saw of the type defined in claim 1 wherein said load cell means is fixedly mounted at one end and carries said first frame means at its other end.

3. In an automatic saw of the type defined in claim 1 where said arm drive means comprises an arm drive motor which is controlled by said electrical output signal.

4. In an automatic saw of the type defined in claim 3 including control means to sense the voltage of said arm drive motor to determine when the load of said workpiece against said saw reduces abruptly thus indicating completion of the sawing operation, said control means serving to retract said arm means to a retracted position.

5. In an automatic saw of the type defined in claim 1 including first control means for presetting a desired saw blade rotational speed and maintaining such speed.

6. In an automatic saw of the type defined in claim 5 including a second control means for presetting a desired force between said workpiece and said saw blade and controlling said arm drive means to maintain said desired force.

7. In an automatic saw of the type defined in claim 6, third control means for sensing the current drawn by said saw blade motor and reducing the force exerted by said workpiece against said saw blade to an amount below said preset desired to the extent necessary to prevent said current from exceeding a desired maximum value.

8. In an automatic saw of the type defined in claim 1 where said arm drive means includes an arm drive motor, first control means for sensing the speed of rotation of said saw blade and acting on said saw blade drive motor to maintain a constant preset speed, second control means including said load cell means for sensing the force exerted by said workpiece on said saw blade and acting on said arm drive motor to maintain a constant preset force, and third control means for sensing the current drawn by said saw blade drive motor and causing said arm drive motor to reduce the force exerted by said workpiece against said saw blade an amount necessary to prevent said current from exceeding a desired maximum value.

9. In an automatic saw of the type defined in claim 1 where said arm means is mounted for partial rotational movement on an arm shaft, said arm shaft being longitudinally extendable and retractable, and removal control means for controlling the length of said arm shaft to control the amount of material removed from said workpiece during a sawing operation.

10. In an automatic saw of the type defined in claim 9 where said removal control means includes micrometer means and optical sensor means.

11. In an automatic saw of the type defined in claim 1 where said arm drive means includes an arm shaft which permits limited rotational movement of said arm about the axis of said arm shaft, a gear segment mounted on said arm shaft, a drive pinion in driving relation with said gear segment, drive pulley means rotating said drive pinion, and an arm drive motor for driving said drive pulley means, said arm drive motor being controlled in response to said electrical output signal.

12. In an automatic saw of the type having a rotatable saw blade for cutting through a workpiece which is carried on a rotatable arm which permits the workpiece to be moved into engagement with the saw blade for cutting through the workpiece, the improvement comprising, in combination, a rotatable saw blade mounted on a first shaft, a saw blade drive motor for rotating said first shaft, first frame means for supporting said saw blade motor and said first shaft and said saw blade, load cell means providing an electrical output signal corresponding to a load supported thereon, said first frame means being mounted on said load cell means to measure the force exerted against said saw blade by said workpiece, arm means for carrying said workpiece, said arm means being mounted for partial rotational movement on an arm shaft, said arm shaft being longitudinally extendable and retractable, ramoval control means for controlling the length of said arm shaft to control the amount of material removed from said workpiece during a sawing operation, and an arm drive motor controlled by said electrical output signal for moving said arm means toward said saw blade.

13. In an automatic saw of the type defined in claim 12 including first control means for sensing the speed of rotation of said saw blade and acting on said saw blade drive motor to maintain a constant preset speed, second control means including said load cell means for sensing the force exerted by said workpiece on said saw blade and acting on said arm drive motor to maintain a constant preset force, and third control means for sensing the current drawn by said saw blade drive motor and causing said arm drive motor to reduce the force exerted by said workpiece against said saw blade by an amount necessary to prevent said current from exceeding a desired maximum value.

14. In an automatic saw of the type having a rotatable saw blade for cutting through a workpiece which is carried on a rotatable arm which permits the workpiece to be moved into engagement with the saw blade for cutting through the workpiece, the improvement comprising, in combination, a rotatably saw blade mounted on a first shaft, a saw blade drive motor for rotating said first shaft, first frame means for supporting said saw blade motor and said first and said saw blade, load cell means providing an electrical output signal corresponding to a load supported thereon, said load cell means being fixedly mounted at one end and said first frame means being mounted on the other end thereof to measure the force exerted against said saw blade by said workpiece, said rotatable arm being mounted for partial rotational movement on an arm shaft, said arm shaft being longitudinally extendable and retractable, removal control means for controlling the length of said arm shaft to control the amount of material removed from said workpiece during a sawing operation, an arm drive motor controlled by said electrical output signal for moving said rotatable arm toward said saw blade, a gear segment mounted on said arm shaft, a drive pinion in driving relation with said gear segment, and drive pulley means for rotating said drive pinion, said arm drive motor being connected to drive said drive pulley means.

15. In an automatic saw of the type defined in claim 14 including first control means for sensing the speed of rotation of said saw blade and acting on said saw blade drive motor to maintain a constant preset speed, second control means including said load cell means for sensing the force exerted by said workpiece on said saw blade and acting on said arm drive motor to maintain a constant preset force, and third control means for sensing the current drawn by said saw blade drive motor and causing said arm drive motor to reduce the force exerted by said workpiece against said saw blade by an amount necessary to prevent said current from exceeding a desired maximum value.

* * * * *